Feb. 6, 1945.  D. A. MARRA  2,368,716
BLOWPIPE TIP AND METHOD OF PRODUCTION
Filed April 4, 1942
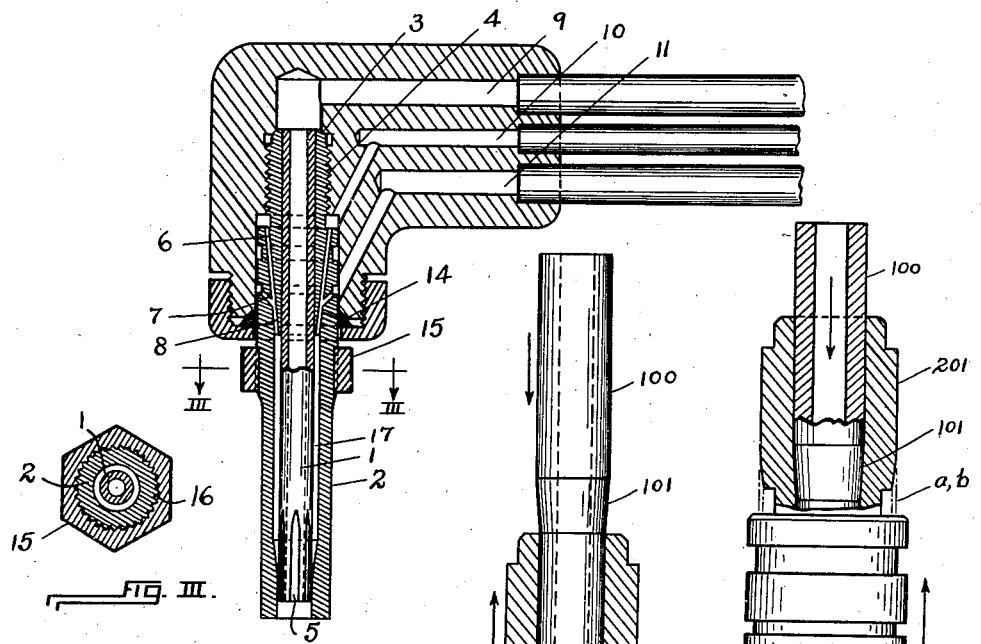
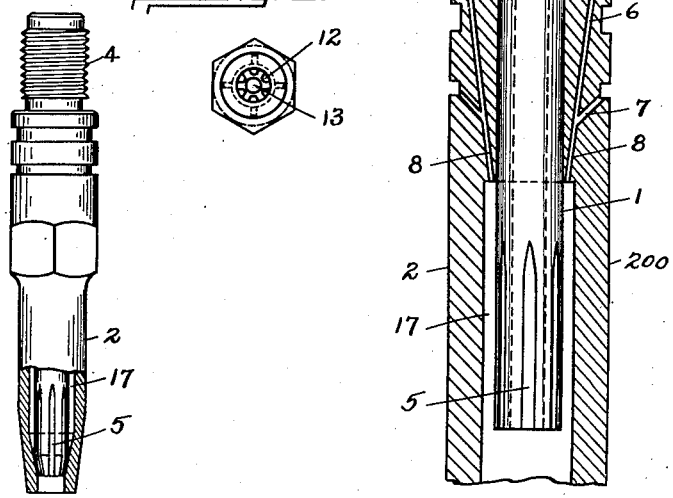
INVENTOR
Daniel A. Marra
BY Christy, Parmelee and Strickland
ATTORNEYS Patented Feb. 6, 1945

2,368,716

UNITED STATES PATENT OFFICE 2,368,716

BLOWPIPE TIP AND METHOD OF PRODUCTION

Daniel A. Marra, Cheswick, Pa.

Application April 4, 1942, Serial No. 437,646

4 Claims. (Cl. 158—27.4)

This invention relates to tips for blowpipes; and consists in a method of manufacturing cutting tips and the product. The objects in view are cheapness and efficiency.

In the accompanying drawing Fig. I is a fragmentary view showing in section the head of a blowpipe that carries in assembled position a tip of the invention; Fig. II is a view of the tip in end elevation; Fig. III is a view in cross section, on the plane indicated at III—III, Fig. I; Figs. IV and V are fragmentary views to larger scale, partly in elevation, partly in section, and illustrating diagrammatically the method of the invention; Fig. VI is a view partly in elevation, partly in section, which, in comparison with Fig. I, illustrates a modification in detail.

The cutting tip of well-standardized type is an essentially tubular article having a central axial passageway for cutting oxygen, and surrounding, concentrically arranged, passageways for a combustible mixture of air and gas. It is conventional to make the tip of two essentially tubular members and to assemble them telescopically. The inner member is adapted to be brought to bear in gas-tight union upon a seat formed in the head of the torch; and the outer member is adapted to make screw-threaded engagement with the head of the torch. The assembled tip is applied as a unit, and the screwing of it to the head establishes the gas-tight union mentioned. Referring to Fig. I of the drawing, the tip will be seen to consist of an inner member 1 and an outer member 2; the seat in the head, upon which the inner member is pressed in gas-tight union, is indicated at 3; and the screw-threaded union of the outer tip member with the head is indicated at 4.

As shown in Fig. I, the inner tip member 1 is a simple tube of uniform diameter, modified only at the distal delivery end by a circumferential succession of longitudinally extending slots 5 sunk in its outer surface. The outer member is essentially tubular. Toward its ends it snugly engages the outer surface of the inner member, and medially its bore is enlarged. The outer member in its basal intake portion is provided with drilled passageways 6 and 7 that open through the outer surface, lead inwardly and forwardly, unite and continue in passageways 8, and open to the space formed by the medial enlargement of the bore. When the tip is assembled and seated in the head the bore of the inner tip member is in communication with a passageway 9 that carries cutting oxygen; the tip passageways 6 and 7 are severally in communication with a gas passageway 10 and an air passageway 11; while the slots 5 at the distal end of the inner tip member form with the enveloping wall of the outer tip member a cluster of orifices 12 surrounding the central orifice 13. A packing gland 14 makes tight the seam formed by and between the outer wall of the tip and the recess in the blowpipe head formed to receive it. In operation flame emerges from orifices 12 and the flame plays upon the work until it is heated to proper temperature. A jet of oxygen is then projected through orifice 13, and under this jet the burning is effected that is termed cutting. In general features the structure described is conventional, and the mode of operation also is conventional.

It is necessary that in a tip so constructed and so applied the union of the inner and outer members be so secure as to effect the gas-tight seating of the inner member in response to the screwing of the assembly to place by means of the screw threads formed in the outer member. Various expedients have been taken to realize such security of union. The parts have in some cases been keyed together; in other cases the continuity of the cylindrical surfaces of contact has been interrupted by recess and protrusion. Such expedients add to cost of production, involve delay in speed of production, and introduce into the structure a point of weakness and liability to wear and deterioration. My invention presents a solution of these difficulties and disadvantages and affords an effective union of simplest sort.

In the finished tip the exterior surface is necessarily minutely accurate in shape and size, to fill snugly the recess in the head formed to receive it, and is provided with the screw thread by which union is effected. My invention involves the perception that the union of the tip members may be effected by the driving of the inner member into a bore of smaller size formed in the tubular part that is to become the outer tip member, and in so doing, with expansion of the wall of the outer part, to effect a union of most intimate nature and wholly adequate for the ends in view; and thereafter to shape minutely the outer surface of the assembled unit, bringing it accurately to size, and either cutting de novo or retracting threads initially provided on the outer part.

Referring to Figs. IV and V of the drawing, the inner member 100 will be seen to be tapered, conveniently by a tapered region 101 of relatively small extent, from a distal end of smaller diameter to a basal end of larger diameter. This inner member will advantageously be formed of relatively hard material: brass, for example. The tubular part 200 that in the finished tip becomes the outer member is advantageously formed of relatively soft material: copper, for example. It may be initially provided with the passages 6, 7, and 8 already described. These, I find, being initially formed, will persist in the finished article. The bore of this tubular part is, throughout proper and sufficient portions of its extent, initially of such diameter as to allow the free entrance of the distal end of the inner tip member, but of a diameter somewhat less than that of the basal portion of the inner member. The parts are brought to the position shown in Fig. IV and then are driven as indicated by arrows through the position of Fig. V to the completely assembled position of Fig. I. In Fig. V the progressive enlargement of the outer tubular part 200 is indicated by the broken lines a, b, and the bulging to which the lines a, b upwardly lead. The union so effected I term a drift fit or drift joint. When the parts have thus been brought to completely assembled position the exterior surface may be minutely shaped as already described, and a screw thread may be cut in the portion 201, to effect the union 4, Fig. I. This over-size of the portion 100 of the inner tube member is, it will be understood, exaggerated in its proportions in the showings of Figs. IV and V. The excess in diameter of the portion 100 over the distal portion of the inner member is a matter of a few thousandths of an inch and is beyond the possibility of showing in the scale drawing of Fig. I.

In Fig. I the inner tip member is of uniform diameter throughout its distal region; in Fig. VI it is of tapering form. In both cases the outer member is correspondingly shaped. In both cases, it will be perceived that the thrust that is effective in assembling the parts in the manner described may be made additionally effective to make drift fit between the meeting surfaces in this part also of the structure.

The chamber formed by and between the tip members in their medial portion is at its ends sealed by the drift fit described. I say sealed in the sense that the chamber is hermetically closed, save for the flow therethrough which is permitted by the passages 6, 7, 8 and grooves 5.

The assembled tip must in any case be provided exteriorly with a hex (to use the parlance of the industry); that is to say, polygonal faces (ordinarily the faces of a hexagon), to be engaged by a wrench for seating the tip in the head. Fig. V shows the tubular part to have been initially provided with such a hex 202. The swelling of the part in making assembly will not render this feature less effective.

An alternate way of providing the hex is illustrated in Figs. I and III. An annular body 15 of such hard material as steel, shaped exteriorly like a nut, is provided within its bore 16 with longitudinally extending ridges or teeth. This member is of such size that it may be driven to place as shown in Fig. I, and in the driving the teeth within the member 15 are sunk into the substance of the copper of the outer tip member 2, and so a secure union is effected. Wrenching exerted upon the hex 15 will be effective to bring the integrated tip securely and effectively to its seat.

Tips of the assembled structure of Fig. I, and operating in the manner indicated, are known. Heretofore, however, no tip of such structure has been made as an integral member, applicable and removable as a unit. As I have indicated, the outer member is prepared as a tubular blank, of enlarged bore in its medial portion and of smaller bore at the ends; and, in the basal portion the passageways 6, 7, andn 8 are formed. In the assembled structure the gas and the air for the heating flame enter the tip through the passageways 6 and 7; the two streams meet and mingle in the passageway 8. From passageway 8 the mingled stream enters the chamber 17 formed by and between the tip members in their medial portion; and from this chamber the well mingled combustible mixture emerges through the orifices 12 to burn in a cluster or rosette of flame.

I claim as my invention:

1. A blowpipe tip consisting of two tubular members telescopically united at their basal and distal ends in drift joints that are gas-tight, and medially spaced apart to form a chamber between the walls of the tubular members and the gas-tight joints; the outer member being penetrated from the outside by two passages that meet and are continued in a single passage leading to such chamber, and the inner member being grooved longitudinally in grooves that in the assembly form passageways leading from such chamber to the distal end of the tip.

2. A blowpipe tip comprising outer and inner elongated tubular members telescopically assembled in a drift fit and forming by and between the bodies of said members a gas-mixing chamber, with the members engaged adjacent the opposite ends of said chamber, said inner member being formed of a material more resistant to deformation than the outer member, whereby the deformation occasioned by such assembly may be remedied by a subsequent external shaping of the outer member, the outer member being penetrated at one end of the assembled tip by a plurality of passages that open inwardly to said mixing chamber, and a plurality of passages extending outwardly from said chamber at the opposite end of the assembled tip.

3. A blowpipe tip comprising inner and outer elongated tubular members telescopically assembled in a drift fit, said outer member having an enlarged bore in its medial portion and being of smaller bore at its ends and being penetrated adjacent one end by a plurality of passages that communicate with said enlarged bore portion, said inner tubular member being formed of material more resistant to deformation than the outer member, said outer member having its exterior machined to eliminate the deformation caused by the drift-fit assembly of the members, a gas-mixing chamber formed by and between the bodies of said members and within the enlarged bore portion of said outer member, the two members being engaged adjacent their opposite ends, and passages extending from said chamber outward through the end of the assembled members opposite to that in which the passages first mentioned are located.

4. The method herein described of producing a blowpipe tip shaped externally for engagement with a blowpipe head which comprises forming an inner tubular tip member of relatively hard material and an outer tip member of relatively soft material for telescopic assembly to provide by and between the assembled tip members a mixing chamber, with a plurality of passages extending adjacent one end of the assembled members inward through the outer member to said mixing chamber, and a plurality of passages extending at the opposite end of the assembled members outward from said mixing chamber, uniting the two members in a drift fit, with the members engaged adjacent the opposite ends of said chamber and the consequent displacement of material due to the drift fit effecting an expansion of the outer member, and subsequently externally shaping the expanded outer member of the so-assembled structure to provide for snug engagement of the tip with a blowpipe head.

DANIEL A. MARRA.